United States Patent [19]
Sombrowsky

[11] Patent Number: 5,416,509
[45] Date of Patent: May 16, 1995

[54] METHOD AND APPARATUS FOR THE GENERATION OF A STEREOSCOPIC PRESENTATION

[75] Inventor: Reiner Sombrowsky, Staatsangehörigkeit, Germany

[73] Assignee: ICE Oelsnitz GmbH, Oelsnitz, Germany

[21] Appl. No.: 111,123

[22] Filed: Aug. 24, 1993

[30] Foreign Application Priority Data

Aug. 25, 1992 [DE] Germany .............. 42 28 111

[51] Int. Cl.$^6$ ............... H04N 13/00; H04N 13/02; H04N 13/04
[52] U.S. Cl. ............................ 348/42; 348/46; 348/51
[58] Field of Search ............. 348/42, 58, 59, 51, 348/52, 46; 350/132; H04N 13/00, 13/02, 13/04

[56] References Cited

U.S. PATENT DOCUMENTS

| | | | |
|---|---|---|---|
| 4,367,486 | 1/1983 | Eichenlaub | 348/42 |
| 4,717,949 | 1/1988 | Eichenlaub | 348/42 |
| 4,729,017 | 3/1988 | Sayanagi et al. | 348/42 |
| 4,757,379 | 7/1988 | Wright | 348/42 |
| 4,829,365 | 5/1989 | Eichenlaub | 348/42 |

FOREIGN PATENT DOCUMENTS 3901103  9/1989  Germany .
2244624  4/1991  United Kingdom .

*Primary Examiner*—Howard W. Britton
*Attorney, Agent, or Firm*—Horst M. Kasper

[57] ABSTRACT

A method and apparatus for the generation of stereoscopic presentations allow a viewing of stereoscopic presentations over a large viewing region and without the necessity of auxiliary visual aids such as polarization spectacles or the like. Furthermore, no mechanically moving parts are to be used. The recording of a stereoscopic background coulisse is made possible and a stereoscopic reproduction system can be used without mechanical changes as a two-dimensional reproduction system. Several sufficiently small openings traverse sequentially the complete surface area at a high speed in a special-purpose glass plate disk. Two-dimensional partial images are readied behind the special-purpose glass plate with a special-purpose monitor for each opening position such that the viewer perceives a complete stereoscopic image. Preferably, a charge-coupled device CCD matrix is employed for recording a stereoscopic background coulisse. A like operating special-purpose glass plate is disposed in front of the charge coupled device CCD matrix. Only image change information is transmitted for reducing the band width in case of one transmission channel. The apparatuses are employed in computer technology and television technology.

17 Claims, 5 Drawing Sheets

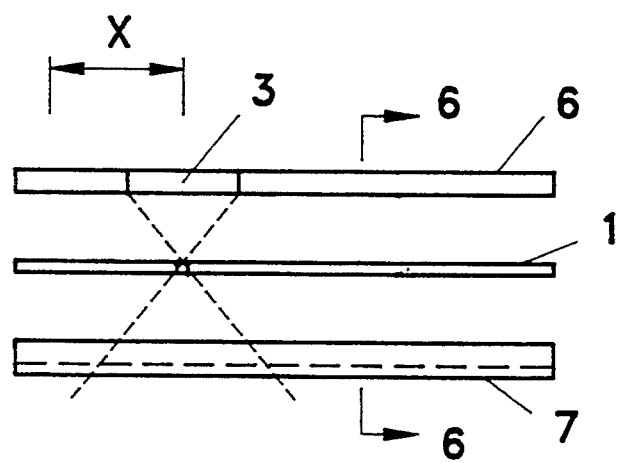
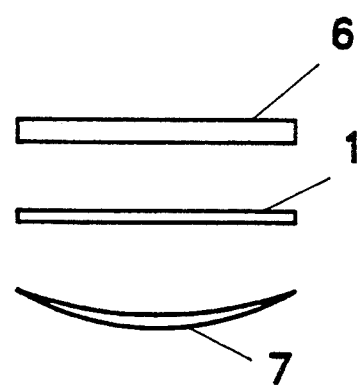

METHOD AND APPARATUS FOR THE GENERATION OF A STEREOSCOPIC PRESENTATION

BACKGROUND OF THE INVENTION

1. Field of the Invention

The invention relates to a method and to an apparatus for the generation of a stereoscopic presentation without employing auxiliary visual aids, wherein the view is possible within wide limits, both with respect to the angle as well as to the distance. The invention method is employed for the reproduction as well as for the recording of stereoscopic presentations.

2. Brief Description of the Background of the Invention Including Prior Art

Various methods and apparatuses have already been found for the generation of stereoscopic presentations. However, these methods and apparatuses are associated with the disadvantage that, nearly without exception, they require auxiliary means such as, for example, auxiliary visual aids and/or, alternatively, they employ parts which are moving mechanically. A device is described in the European Patent 0,470,801, wherein a rapidly rotating special-purpose disk is irradiated with a specifically deflected beam of light in such a way that a spatial image is generated in the range of motion of the disk. However, big problems are generated due to the parts to be moved mechanically and due to the inertia of the masses acting in this context, since no unlimited rapid motion is possible.

The object of the German Patent DE 3,921,061 is directed to a reproduction device for the stereoscopic perception of images, where a stereoscopic image is generated by a specially formed cylindrical lens grid plate and by a flat viewing screen disposed behind the cylindrical lens grid plate. The distance of the cylindrical lens grid plate from the viewing screen and the horizontal position of the cylindrical lens grid plate and the viewing screen can be adjusting depending on the viewer position. This reproduction device is associated with the disadvantage that such a stereoscopic image can be optimally adjusted for only a single viewer position. In case a plurality of viewers are present at different viewer positions, this apparatus is unsuitable.

SUMMARY OF THE INVENTION

1. Purposes of the Invention

It is an object of the present invention to provide a method with a device without employing any mechanically moving parts, which allows to generate stereoscopic presentations without use of auxiliary visual aids, such as polarizing spectacles or the like, where the stereoscopic presentations can be perceived over a large viewer position region.

It is another object of the present invention to allow the recording of a stereoscopic background coulisse and to provide a stereoscopic reproduction system which can be used without mechanical adjusting as a two-dimensional reproduction system.

These and other objects and advantages of the present invention will become evident from the description which follows.

2. Brief Description of the Invention

According to the present invention there is provided for a method for generating stereoscopic presentations. A sufficiently small transparent opening is generated on a face of a special-purpose plate electrically switchable between a transparent state and a non-transparent state. The sufficiently small transparent opening is moved sequentially over the face of the special-purpose plate. The face of the special-purpose plate has applied quickly switchable liquid crystal elements. The liquid crystal elements are switched by electronic control. A two-dimensional partial picture is furnished on a special-purpose monitor having a modified line scanning system located at a defined distance behind such small transparent opening such that, in case of a sufficiently high speed of the process, a viewer will perceive a completely stereoscopic overall image.

A suitable recording sensor can be placed at a defined distance behind a recording special-purpose plate. A sufficiently small transparent recording opening can be generated on a face of the recording special-purpose plate electrically switchable between a transparent state and a non-transparent state. The sufficiently small transparent recording opening can be moved sequentially over the face of the special-purpose plate. The face of the recording special-purpose plate can have applied quickly switchable second liquid crystal elements. The second liquid crystal elements can be switched by electronic control. Two-dimensional partial pictures of a stereoscopic background located in front of the recording special-purpose plate can be recorded with the recording sensor.

The two-dimensional partial picture can be stored in a random access memory. Picture instructions can be transmitted to the special-purpose monitor. The picture instructions can represent a change of substituting a first partial picture to a next following second partial picture. A bandwidth required for recording and reproducing the two-dimensional partial pictures can be reduced. The picture instructions can be provided by picture information or by picture manipulation commands.

The special-purpose plate can be a thin special-purpose glass plate. The special-purpose monitor can be a cathode ray tube monitor. The sufficiently small transparent opening can be a vertically extending slot on the thin special-purpose glass plate supporting a liquid crystal grid.

The stereoscopic presentations can be perceived over a large viewing region and without additional visual aids, and without employing mechanically moving parts.

The recording sensor can be a charge-coupled device CCD-matrix.

A device for generating stereoscopic presentations includes a face of a special-purpose plate electrically switchable between a transparent state and a non-transparent state for generating a sufficiently small transparent opening on the face of the special-purpose plate and for moving the sufficiently small transparent opening sequentially over the face of the special-purpose plate face. The face of the special-purpose plate has applied quickly switchable liquid crystal elements. A plate face electronic control system is connected to the face of the special-purpose plate. The liquid crystal elements are switched by the electronic control system. A special-purpose monitor has a modified line scanning system. The special-purpose monitor is located at a defined distance behind such an opening of the face of the special-purpose plate for furnishing a two-dimensional partial picture on the special-purpose monitor such that, in case of a sufficiently high speed of the process, a viewer will perceive a completely stereoscopic overall image through the small transparent opening.

A random access memory can store the two-dimensional partial picture and can be connected to the special-purpose monitor for transmitting picture instructions to the special-purpose monitor. The picture instructions can represent a change of substituting a first partial picture to a next following second partial picture. A bandwidth reduction unit can be provided for reducing a bandwidth required for reproducing the two-dimensional partial pictures.

The special-purpose monitor can be a cathode ray tube monitor. The special-purpose plate can be a thin special-purpose glass plate. The sufficiently small transparent opening can be a vertically extending slot on the thin special-purpose plate supporting a liquid crystal grid.

Preferably, no mechanically moving parts and no additional visual aids are present such that the stereoscopic presentations can be perceived over a large viewing region and without additional visual aids and without employing mechanically moving parts.

A plate electronics can be connected to the face of the special-purpose plate. A monitor electronics can be connected to the special-purpose monitor and to the plate electronics for synchronization of the small transparent opening to a flying spot of the special-purpose monitor. A video driver can be connected to the monitor electronics. A picture storage can be connected to the video driver.

The special-purpose plate is transparent. A bandwidth restoring unit can be provided for restoring a bandwidth required for the reproducing of the two-dimensional part pictures.

A suitable recording sensor, such as a charge-coupled device CCD-matrix, is placed at a defined distance behind a recording special-purpose plate for recording two-dimensional partial pictures of a stereoscopic background located in front of the recording special-purpose plate with the recording sensor.

A recording electronics can be connected to the recording sensor for processing electronic signals received from the recording sensor. A picture storage unit can be connected to the recording electronics for recording signals delivered by the recording electronics.

A bandwidth reduction unit can be interposed between and connected to the recording electronics and the picture storage.

The invention method comprises that preferably several sufficiently small, transparent openings are sequentially generated at all coordinate points of an opaque and non-transparent, planar viewer screen wall. In each case a two-dimensional part image is provided coordinated to each position of such an opening and at a precisely defined distance behind said opening such that a viewer perceives a complete, spatial image over a large region of viewing positions based on the speed of the process and the inertia of the eye. This is achieved in that a corresponding part image behind an opening position is the two-dimensional projection of a spatial background from the perspective of the opening position, and a viewer recognizes with each eye only a minute detail of such a part image through the corresponding opening when looking from a corresponding standing position. A complete spatial perception occurs in such a case, where holes are employed as openings, and wherein the part images behind these holes are furnished with a corresponding height expansion and width expansion corresponding to the maximum possible viewing angle. Based on the fact that a viewer in general can only perceive a horizontal stereo impression, since both eyes are on a single height level, the openings employed in the viewing wall are preferably in the shape of transparent longitudinal slots. Said longitudinal slots are moving in a horizontal direction over the complete viewing wall region at a sufficiently high speed. In each case a corresponding part image in the shape of a strip image is provided and readied relative to these longitudinal slots in the background. This is technically being realized by preferably employing a thin, special-purpose glass plate as a viewing wall. Rapidly switchable liquid crystal elements are utilized in such a way in said glass plate that openings in the shape of transparent longitudinal slots are generated based on an electronic control circuit system. Said longitudinal slots move in a horizontal direction over the complete special-purpose glass plate at a sufficiently high speed, where such high speed is sufficiently large in order to generate a continuous impression upon viewing based on the inertia of the eye. A special-purpose monitor is placed at a precisely defined distance relative to the special-purpose glass plate. The special-purpose monitor is furnished with a varied line motion in contrast to other monitors. The monitor generates a complete part image, belonging to the actual slot position, during a short dwell time period of the longitudinal slot, where the part image is in the shape of a strip of a corresponding width, and wherein the line motion occurs only within the boundaries of this part image. The distance of the special-purpose glass plate from the surface of the monitor and the width of a part image influence directly the maximum possible viewing angle, whereas the image point resolution of the monitor determines the maximum possible distance of the viewer, at which maximum distance a stereoscopic perception is still possible. A longitudinal slot is preferably also based on the reason that, in case of use of a traversing hole, there is required an extremely high image point frequency during the generation of the respective part images with the aid of the monitor.

The extremely high image point frequency and the necessary maximum brightness of the monitor are further additionally reduced by providing that, preferably, a monitor with several radiation systems is employed, wherein the maximum horizontal deflection of a beam system reaches at most up to half of the horizontal deflection region of the next beam system. The deflection of the beam system is performed such that no beams are crossing. A parallel operation of several transparent slots in the special-purpose glass plate is necessary in this case, wherein a slot is coordinated to each beam system. The horizontal motion of a slot does not occur in this case over the complete surface area but only up to the boundary of the next slot. This achieves a substantial reduction of the image point frequency of the monitor in the background, since a substantially smaller number of part images per slot and thus of image points have to be provided and readied in the same time unit. The above recited system is associated with the advantage as a method that it can also operate with a conventional two-dimensional monitor operation, in that the special-purpose glass plate of the system is transparent and the monitor in the background is switched into a standard line operation, or by having the strip images in the background only as segments of a two-dimensional overall image during standard operation. In spite of the improvements resulting from an application of several beam systems, a very high image point frequency is still necessary for the generation of a flicker-free image. This is relatively problemfree in local systems. If a transmission channel with a limited band width is necessary between the recording system and the reproduction system, then a band width reduction is achieved by coordinating an image point memory storage to each individual slot. Said image point memory storage is capable of storing all image points of a respective part image. Since the image information is in general not substantially changed during the motion of the slot but only the perspective is slightly changed, it is sufficient to transfer only the image points to be changed or to transfer even commands for the image separation. The described method can analogously also be employed for the recording of stereoscopic backgrounds. For this purpose, an image-recording matrix, preferably a charge coupled device CCD sensor, is employed behind an above described special-purpose glass plate and at a defined distance behind said glass plate. The image-recording matrix records a corresponding two-dimensional strip image of a spatial background in front of the special-purpose glass plate relative to the actual slot position.

The method can be employed both in the computer technology as well as in the television technology with the respective band width reduction.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which are shown several of the various possible embodiments of the present invention:

FIG. 5 is a top planar view of a schematic diagram illustrating a recording device for stereoscopic backgrounds; and FIG. 6 is a sectional view of a recording device for stereoscopic backgrounds along section line 6—6 of FIG. 5;

DESCRIPTION OF INVENTION AND PREFERRED EMBODIMENT

According to the present invention there are generated one or more openings covering the whole face of the complete viewing wall plane in time sequence and a part image or partial picture is furnished behind each individual opening position on a monitor screen. In this context, several openings can also be simultaneously generated, wherein the corresponding part image cannot overlap in the background. The viewing wall is a surface, where a viewer perceives a stereoscopic presentation based on the invention method. An opening in this context is a transparent element of an arbitrary shape placed in a nontransparent viewing wall. A hole represents a specific kind of an opening, where the height dimension and the width dimension are comparable in this specific opening. A slot represents an elongated opening in the context of the present invention, where the elongation direction is aligned in a vertical direction. A longitudinal slot has a specific shape of an opening, where the height of the slot extends over the full height of the image screen.

An opening position is a defined position of an opening in a viewing wall and, similarly, a slot position is a defined position of a slot in the nontransparent wall.

Figure 1:
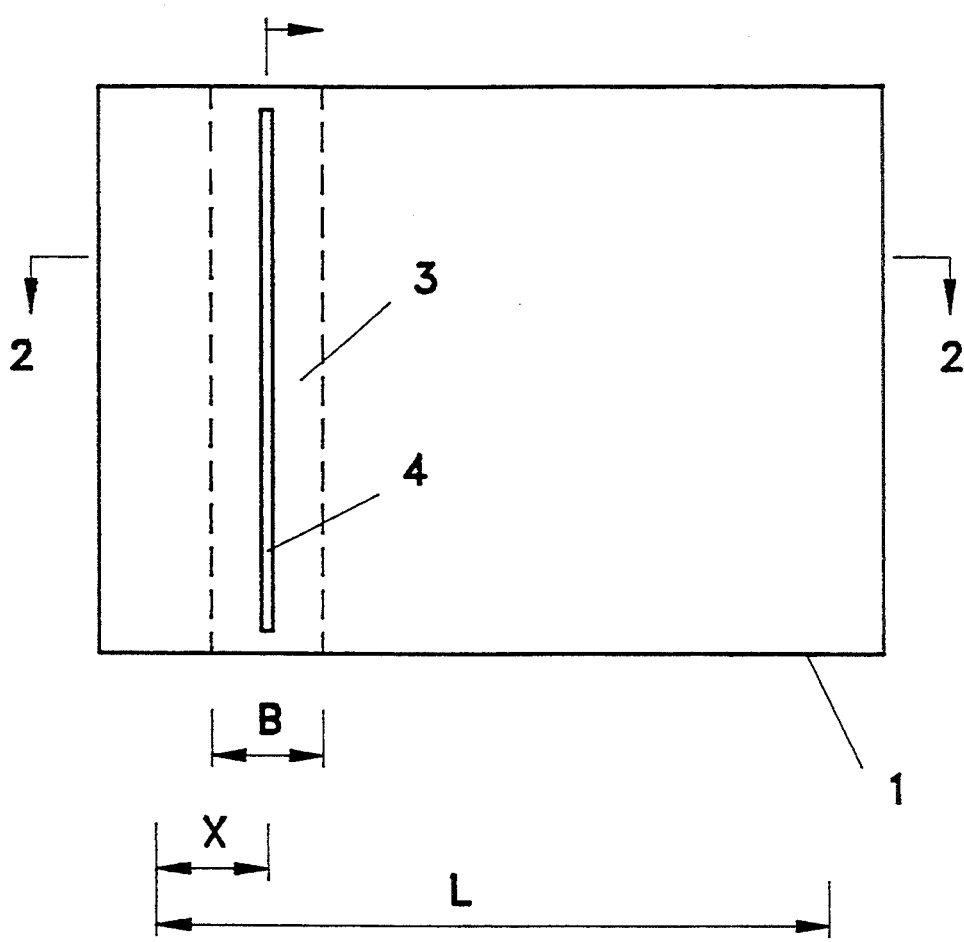
FIG. 1 is a view of a schematic diagram showing a device for the generation of stereoscopic presentations employing a single-beam special-purpose monitor.
Figure 2:
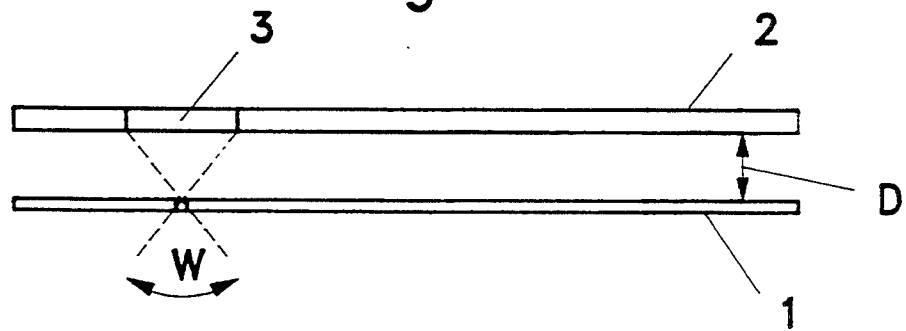
FIG. 2 is a sectional view of the device for the generation of stereoscopic presentations employing a single-beam special-purpose monitor along section line 2—2 of FIG. 1.

In the apparatus for the generation of stereoscopic presentations according to FIGS. 1 and 2, a thin special-purpose glass plate 1, representing the viewing wall, is disposed at a distance D in front of a single-beam special-purpose monitor 2 of a high luminous intensity and of a high maximum image point frequency.

The term stereoscopic presentation defines a three-dimensional representation similar to a hologram in the context of the present invention, i.e. a view generated by the present invention structure gives the impression to the viewer as if the view exhibits an actual depth and as having actually three dimensions. The term stereoscopic presentation in the sense of the present invention does not mean a simple projection of a three-dimensional setting onto a two-dimensional image screen surface.

The special-purpose glass plate 1 is furnished with rapidly switchable liquid crystal elements. The special-purpose glass plate is a glass plate, which is furnished preferably with fast switching liquid crystal elements, such that, based on an electronic control of the liquid crystal elements, there can be generated sufficiently small transparent openings over the complete face of the glass plate. It is possible to position an opening in the shape of a narrow longitudinal slot 4 at successive horizontal positions over the region L with the switchable liquid crystal elements by electronic control. The speed of this process is sufficiently high in order to generate for the viewer a flicker-free stereoscopic overall image based on the inertia of the eye not being capable of observing the scanning process of the moving slot 4. The sufficiently large speed of scanning of the slot over the thin special-purpose glass plate represents a value of the speed which is just sufficiently large to meet the requirements of a completely flicker-free stereoscopic overall image to be perceived by a human eye.

A strip image 3 of a width B, as shown in FIG. 1, is generated with the special-purpose monitor 2 when the longitudinal slot 4 is in a position X. A strip of a corresponding width according to the present invention is a strip generated on the monitor screen with a width meeting the definition of the strip image 3. A strip image is a special form of a part image associated with an opening in the form of a longitudinal slot, where the part image assumes the complete height of the picture screen of the special-purpose monitor, and where the width of the part image is of such size that, in case of a maximum viewing angle, the image information, viewed through the corresponding longitudinal slot, is still disposed within the respective part image.

A special-purpose monitor represents a monitor with a line scanning system modified relative to a line scanning system of conventional monitors. The changed and modified line scanning system is characterized in that it is running only within the limits of a strip image and not over the complete monitor surface. The horizontal line motion of the monitor beam system moves only within the width B and not over the complete monitor width. A single-beam special-purpose monitor is a monitor which includes only one beam system. In case of color picture tubes, the red, green, and blue system is combined into a one-beam system.

An individual part image is thus the two-dimensional projection of a spatial background from the perspective of the actual slot position. A spatial background or a spatial coulisse represent space, where different three-dimensional objects or, respectively, three-dimensional bodies are present in said space. A spatial coulisse does not represent a planer projection on a face.

A partial picture or part image is one picture out of a complete sequence of two-dimensional pictures. Exactly one such partial picture belongs to each position assumed by the opening and, more specifically, each slot position. Partial pictures are the two-dimensional projection of a spatial background coulisse from the position of the respective opening position, i.e. partial pictures can be formed by the production of a photographic image of a spatial coulisse from the location of the opening position. Partial pictures of neighboring opening positions are only slightly different from each other relative to the contents of the image. In contrast, partial pictures of neighboring opening positions are slightly shifted with respect to their perspective.

The dwelling time of the slot 4 at an individual position on the thin special-purpose glass plate 1 is of such length as to allow to image a complete partial picture, defined by a strip image 3 of a width B, on the special-purpose monitor behind the associated position of the slot 4.

A sufficiently small opening is an opening in the viewing wall, which can at the most be so large that a viewer recognizes with two eyes only such details of a corresponding partial picture in the background, where such details do not overlap, in the context of a maximum predetermined distance of the viewer from the viewing wall, and where a stereoscopic presentation is still to be possible. The width of the longitudinal slot refers to and corresponds to the definition of the sufficiently small opening. In particular, a sufficiently small slot allows in a viewer location up to the maximum distance of the viewer from the viewing wall that the two eyes of the viewer will recognize and resolve light emitted by different neighboring spots on the monitor.

The maximum possible viewing angle W covering possible observer positions relative to the slot 4 is defined by the width B (FIG. 1) and the distance D (FIG. 2) by the relationship $\tang(W/2)=B/2D$. The image point resolution of the strip image 3 is of such size that, in case of a maximum viewing distance, a different image point on the monitor is transmitted to each eye of the viewer through the longitudinal slot 4 and, in particular, a different image point generated by a horizontal scan of the flying spot on the monitor. In order to be able to perceive a stereoscopic presentation in case of a defined maximum viewing distance, the two eyes of the viewer have to be able still to recognize different image information of a partial picture through the respective longitudinal slot. This recognition is only possible in case of a sufficient image point resolution of the monitor adapted to the defined maximum viewing distance. The image point resolution designates the number of image points per face area, where the contents of a picture is reproduced by the image points. A larger maximum viewing angle results, when, in case of a fixed partial picture width, the distance of the special-purpose glass plate from the monitor surface is decreased or, alternatively, when, in case of a fixed distance of the special-purpose glass plate from the monitor surface, the partial picture width is increased. The maximum viewing angle is the largest angle, where a viewer is still in a position to recognize a detail of a corresponding part picture through an opening. The maximum viewing angle is the angle between one opening position and the edges of the corresponding part pictures. The partial picture information belonging to the opening is of importance only within this specific maximum viewing angle. The extremely high image point frequency on the monitor relative to conventional monitor operation is higher by the number of the image points of a partial image. In particular, the image point frequency is substantially equal to or at least the number of image points of a partial picture on the monitor multiplied by the frequency of the slot generation on the thin special-purpose glass plate 1.

A flicker-free image is defined in that no difference between the illuminated phase and the dark phase of an image point is visible and perceivable to the naked eye in case of a non-changing image contents presented by the special-purpose monitor based on the inertia of the eyes of a viewer.

Figure 3:
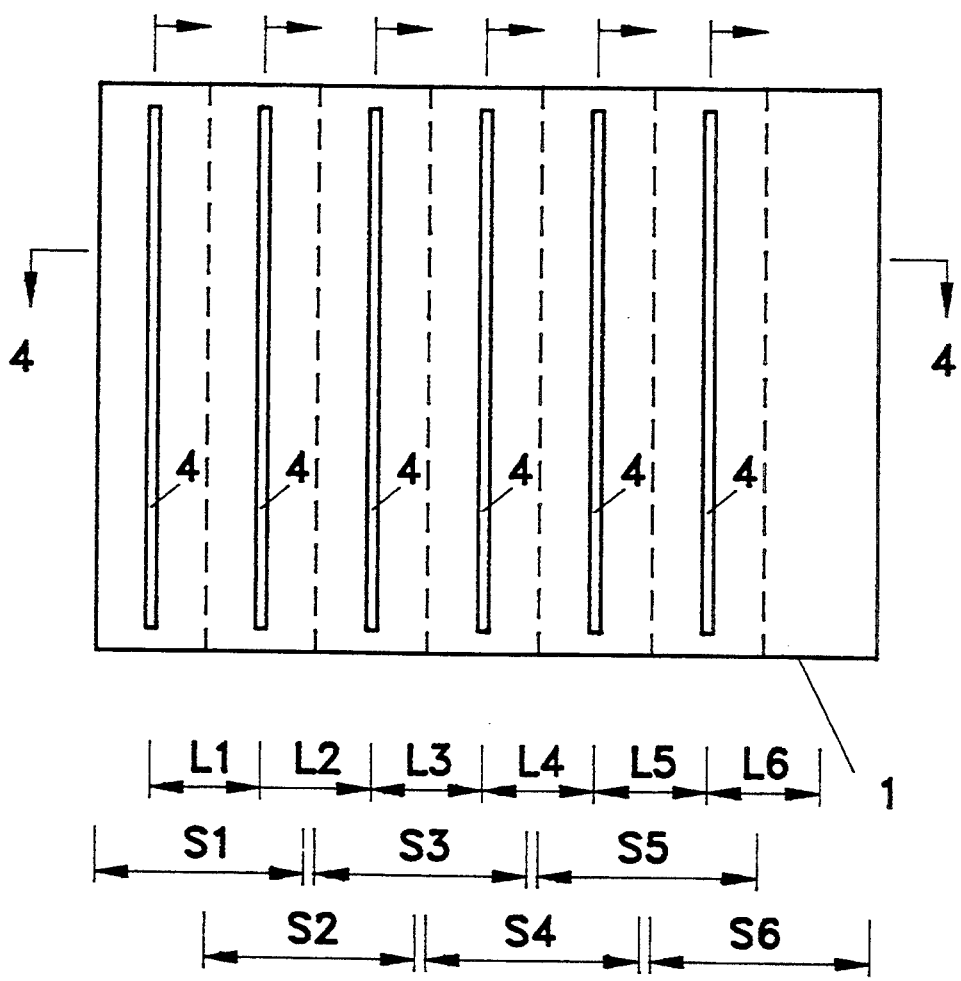
FIG. 3 is a first elevational view of a schematic diagram showing a device for the generation of a stereoscopic presentation employing a multi-beam special-purpose monitor.
Figure 4:
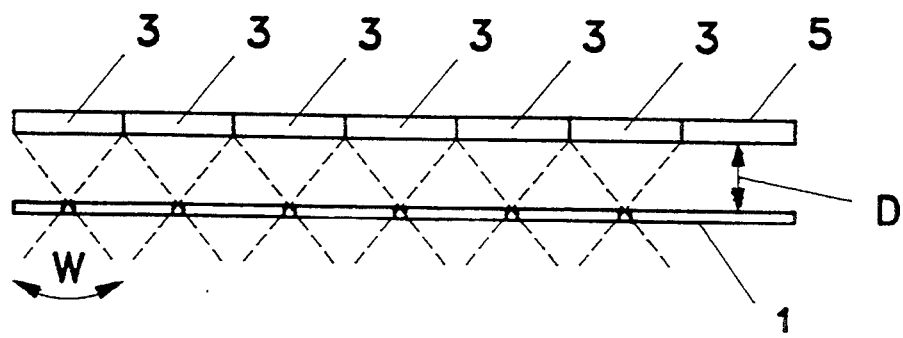
FIG. 4 is a sectional view of a device for the generation of a stereoscopic presentation employing a multi-beam special-purpose monitor along section line 4—4 of FIG. 3.

In the case of the generation of a stereoscopic presentation according to FIGS. 3 and 4, there is employed a special-purpose multi-beam monitor 5 with six beam systems instead of the single-beam monitor 2 shown in FIG. 2. A multi-beam special-purpose monitor is a monitor containing several beam systems. In case of color picture tubes, the red, green, and blue system is combined to a one-beam system. Each beam systems has its own image region which is delimited in horizontal direction and thus represents a vertically disposed strip on the special-purpose monitor.

An electronic control of the special-purpose glass plate 1 is provided such that six longitudinal slots 4 move simultaneously within the boundaries L1 to L6 (FIG. 3). A one beam system provides and readies corresponding strip images 3 for each longitudinal slot 4. The horizontal deflection region of the beam systems moves within the boundaries S1 to S5, wherein the simultaneously generated strip images 3 of the beam system do not overlap. Based on the parallel operation of the beam systems, the image point frequency and the required maximum luminosity of a beam system is substantially reduced.

According to the recording device for stereoscopic backgrounds and three-dimensional backgrounds according to FIGS. 5 and 6, there are recorded corresponding strip images 3 with the charge coupled device CCD matrix 6 through a special-purpose cylindrical lens 7 for a respective slot position X of the special-purpose glass plate 1. These strip images 3 are transformed into corresponding electrical signals and the strip images 3 can be transformed in a reproduction device into the corresponding stereoscopic presentation.

Figure 7:
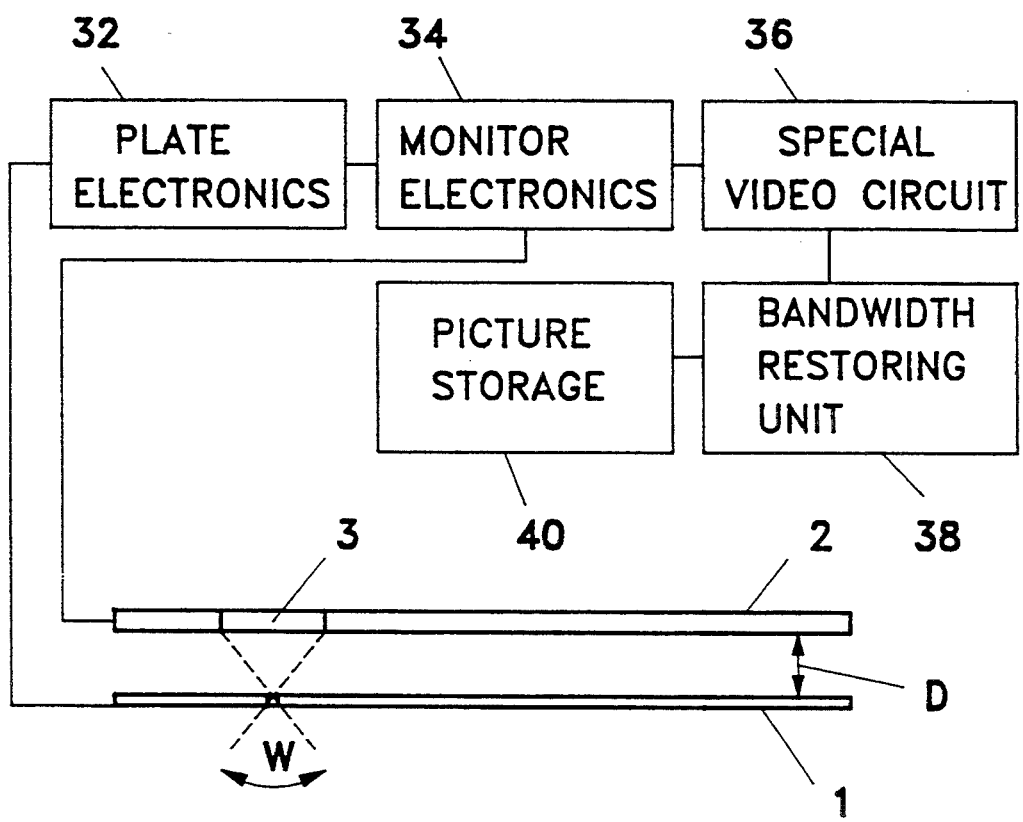
FIG. 7 is a schematic circuit diagram showing connections of the device of FIG. 1 and FIG. 2.

FIG. 7 illustrates schematically circuitry employed in the operation of the reproduction system according to the present invention. A plate electronics 32 is connected to the special-purpose glass plate 1 for controlling the rapidly switchable liquid crystals on the face of the special-purpose glass plate 1. A monitor electronics 34 is connected to the plate electronics 32 for synchronization purposes and to the special-purpose monitor 2 for providing an electrical drive for display elements of the special-purpose monitor 2. A special-purpose video circuit 36 is connected to the monitor electronics 34 to furnish appropriate control and actuation signals to the monitor electronics. A bandwidth restoring unit 38 is connected to the special-purpose video circuit to provide restored storage signals to the special-purpose video circuit. A picture storage unit 40 is connected to the bandwidth restoring unit 38 such that bandwidth reduced signals, delivered by the storage unit, can be transformed into signals processable by the special-purpose video circuit 36.

Figure 8:
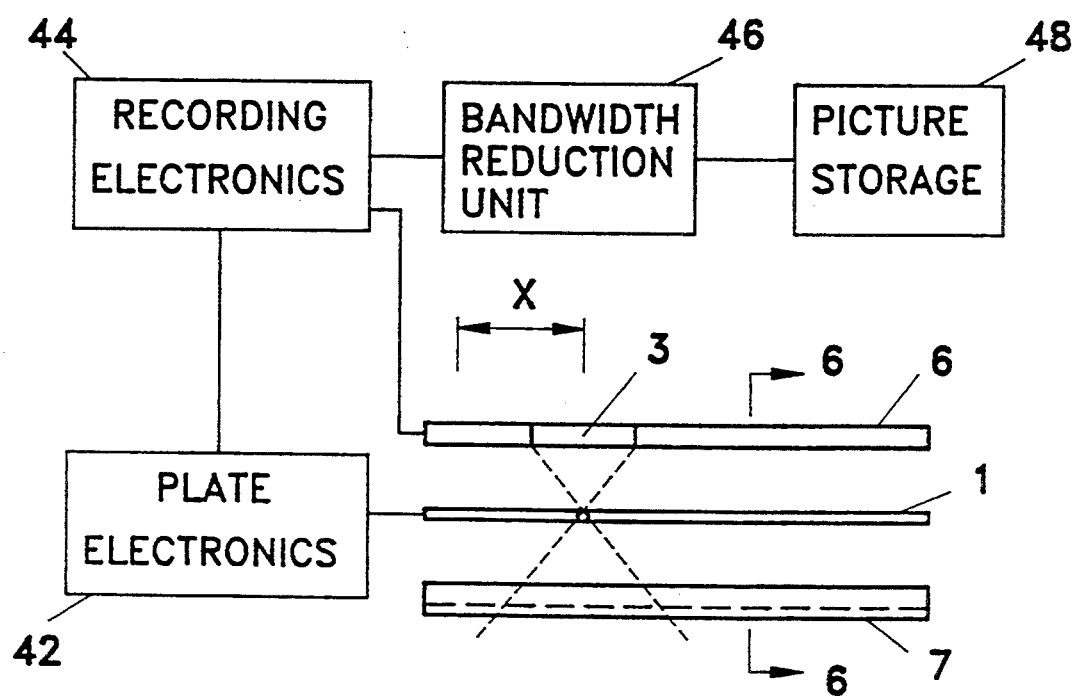
FIG. 8 is a schematic circuit diagram of the recording device illustrated in FIGS. 5 and 6.

FIG. 8 illustrates schematically circuitry employed in the operation of the recording system according to the present invention. A plate electronics 42 is connected to the special-purpose glass plate 1 for controlling the switching of liquid crystal elements disposed on the face of the special-purpose glass plate 1. A recording electronics 44 is connected to the plate electronics 42 for synchronization purposes of signals controlling the special-purpose glass plate 1 and of signals received by the recording sensor. The recording electronics is further connected to the charge coupled device CCD matrix 6 for receiving signals from the recording sensor. A bandwidth reduction unit 46 receives signals processed by and delivered from the recording electronics 44 for reducing the bandwidth or the sequence of pictures processed by the recording electronics 44. A picture storage unit 48 is connected to the bandwidth reducing unit 46 for receiving reduced bandwidth picture information and for recording such reduced bandwidth picture information on a magnetic storage medium or on an optical storage medium.

A mode of operation of the present invention is as follows. A maximum distance view to viewing wall is established and a maximum viewing angle is determined. A distance between the special-purpose monitor and the thin special-purpose glass plate is established based on and meeting the relationship tang(W/2)=B/2D or tang(W/2) smaller than B/2D. Then a width of the slot 4 and a resolution of the image points on the special-purpose monitor are determined such that the right eye of the viewer and the left eye of the viewer will not see the same position of the flying spot of the special-purpose monitor. Then a frequency is established for scanning the slot over a desired area of the screen such that a viewer will observe a flicker-free image. Then a scanning frequency is established for the monitor flying spot such that a complete strip image is generated on the monitor for each position of the slot on the thin special-purpose glass plate. The monitor is operated in synchronization to the positions of the slot 4 on the thin special-purpose glass plate such that there is associated an image strip to each slot 4 on the special-purpose monitor such that the viewer will see through the slot 4 a first position of the flying spot on the special-purpose monitor with the right eye and a second position of the flying spot on the special-purpose monitor with the left eye, thereby giving a three-dimensional view to the eyes of the viewer.

It will be understood that each of the elements described above, or two or more together, may also find a useful application in other types of methods using three-dimensional recording and reproduction devices differing from the types described above.

While the invention has been illustrated and described as embodied in the context of a method and device for the generation of a stereoscopic presentation, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method for generating stereoscopic presentations comprising
   generating a sufficiently small opening on a face of a special-purpose plate by switching electrically liquid crystal elements corresponding to a surface of the sufficiently small opening from a non-transparent state to a transparent state;
   shifting the sufficiently small opening in the transparent state sequentially over the face of the special-purpose plate by switching the sufficiently small opening from the transparent state to the non-transparent state while generating a new sufficiently small opening in the transparent state, where quickly switchable liquid crystal elements are applied to furnish the face of the special-purpose plate, wherein the liquid crystal elements are connected to an electronic control and wherein the liquid crystal elements are switched by the electronic control;
   furnishing a two-dimensional partial picture on a special-purpose monitor having a modified line scanning system wherein the special-purpose monitor is located at a defined distance behind the sufficiently small opening in the transparent state such that, in case of a sufficiently high speed of the shifting of the sufficiently small opening over the face of the special-purpose plate and of the furnishing of the two-dimensional partial picture, a viewer will perceive a completely stereoscopic overall image.

2. The method for generating stereoscopic presentations according to claim 1, wherein the stereoscopic presentations are perceived over a large viewing region.

3. A method for recording two-dimensional partial pictures of a stereoscopic background comprising
   placing a suitable recording sensor at a defined distance behind a recording special-purpose plate;
   generating a sufficiently small recording opening on a face of the recording special-purpose plate by switching electrically liquid crystal elements corresponding to a surface of the sufficiently small recording opening from a non-transparent state to a transparent state;

shifting the sufficiently small recording opening in the transparent state sequentially over the face of the recording special-purpose plate by switching the sufficiently small recording opening from the transparent state to the non-transparent state while generating a new sufficiently small recording opening in the transparent state, where quickly switchable liquid crystal elements are applied to furnish the face of the recording special-purpose plate, wherein the liquid crystal elements are connected to an electronic control and wherein the liquid crystal elements are switched by the electronic control;

recording two-dimensional partial pictures of a stereoscopic background located in front of the recording special-purpose plate.

4. The method for recording two-dimensional partial pictures of a stereoscopic background according to claim 3, further comprising storing the two-dimensional partial picture in a random access memory;

transmitting picture instructions to a special-purpose monitor, where the picture instructions represent a change of substituting a first partial picture to a next following second partial picture;

reducing a bandwidth required for recording the two-dimensional partial pictures.

5. The method for recording two-dimensional partial pictures of a stereoscopic background according to claim 4, wherein the picture instructions are provided by picture information.

6. The method for recording two-dimensional partial pictures of a stereoscopic background according to claim 4, wherein the picture instructions are provided by picture manipulation commands.

7. The method for recording two-dimensional partial pictures of a stereoscopic background according to claim 4, wherein the special-purpose plate is a thin special-purpose glass plate;

wherein the special-purpose monitor is a cathode ray tube monitor;

wherein the sufficiently small opening in the transparent state is a vertically extending slot on the thin special-purpose glass plate supporting a liquid crystal grid.

8. The method for recording two-dimensional partial pictures of a stereoscopic background according to claim 4, wherein the recording sensor is a charge-coupled device CCD-matrix.

9. A device for generating stereoscopic presentations comprising a face of a special-purpose plate having a plurality of sufficiently small openings sequentially disposed and electrically switchable between a transparent state and a non-transparent state over the face of the special-purpose plate, wherein the quickly switchable liquid crystal elements are applied to furnish the face of the special-purpose plate;

a plate face electronic control system connected to the quickly switchable liquid crystal elements of the face of the special-purpose plate, wherein the liquid crystal elements are switched by the electronic control system;

a special-purpose monitor having a modified line scanning system, wherein the special-purpose monitor is located at a defined distance behind the face of the special-purpose plate for furnishing a two-dimensional partial picture on the special-purpose monitor at a sufficiently high speed sequentially creating a transparent opening, wherein the transparent opening is one of the plurality of sufficiently small openings, and furnishing the two-dimensional partial picture, such that, a viewer will perceive a completely stereoscopic overall image of a picture.

10. The device for generating stereoscopic presentations according to claim 9, further comprising a random access memory storing the two-dimensional partial picture and connected to the special-purpose monitor for transmitting picture instructions to the special-purpose monitor, where the picture instructions represent a change of substituting a first partial picture to a next following second partial picture;

a bandwidth reduction unit for reducing a bandwidth required for reproducing the two-dimensional partial pictures.

11. The device for generating stereoscopic presentations according to claim 9, wherein the special-purpose monitor is a cathode ray tube monitor;

wherein the special-purpose plate is a thin special-purpose glass plate;

wherein each one of the plurality of sufficiently small openings is a vertically extending slot on the thin special-purpose plate supporting a liquid crystal grid.

12. The device for generating stereoscopic presentations according to claim 9, wherein the stereoscopic presentations are perceived over a large viewing region.

13. The device for generating stereoscopic presentations according to claim 9, further comprising a plate electronics connected to the face of the special-purpose plate;

a monitor electronics connected to the special-purpose monitor and to the plate electronics for synchronization of the small transparent opening to a flying spot of the special-purpose monitor;

a video driver connected to the monitor electronics;

a picture storage connected to the video driver.

14. The device for generating stereoscopic presentations according to claim 13, wherein the special-purpose plate is transparent; and further comprising a bandwidth restoring unit for restoring a band width required for the reproducing of the two-dimensional part pictures.

15. A device for recording stereoscopic presentations comprising a face of a special-purpose plate electrically switchable between a transparent state and a non-transparent state for generating a sufficiently small transparent opening on the face of the special-purpose plate and for moving a sufficiently small transparent opening sequentially over the face of the special-purpose plate, wherein the face of the special-purpose plate has applied quickly switchable liquid crystal elements;

a plate face electronic control system connected to the face of the special-purpose plate, wherein the liquid crystal elements are switched by the electronic control system;

a suitable recording sensor placed at a defined distance behind a recording special-purpose plate for recording two-dimensional partial pictures of a stereoscopic background located in front of the recording special-purpose plate with the recording sensor.

16. The device for recording stereoscopic presentations according to claim 15, further comprising a recording electronics connected to the recording sensor for processing electronic signals received from the recording sensor;

a picture storage unit connected to the recording electronics for recording signals delivered by the recording electronics.

17. The device for generating stereoscopic presentations according to claim 16, further comprising a bandwidth reduction unit interposed between and connected to the recording electronics and the picture storage;

wherein the recording sensor is a charge-coupled device CCD-matrix.

* * * * *